United States Patent
Searfoss

(10) Patent No.: US 10,434,852 B2
(45) Date of Patent: Oct. 8, 2019

(54) DRIVE ASSEMBLY FOR A COVER SYSTEM FOR OPEN-TOPPED CONTAINERS

(71) Applicant: Aero Industries, Inc., Indianapolis, IN (US)

(72) Inventor: Timothy K. Searfoss, West Branch, MI (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 16/406,820

(22) Filed: May 8, 2019

(65) Prior Publication Data

US 2019/0263236 A1    Aug. 29, 2019

Related U.S. Application Data

(63) Continuation of application No. 15/811,083, filed on Nov. 13, 2017, now Pat. No. 10,328,777, which is a continuation-in-part of application No. 15/252,831, filed on Aug. 31, 2016, now Pat. No. 10,023,033, and (Continued)

(51) Int. Cl.
| | |
|---|---|
| *B60J 7/10* | (2006.01) |
| *B60J 7/08* | (2006.01) |
| *F16H 1/14* | (2006.01) |
| *B60J 11/04* | (2006.01) |
| *F16H 48/10* | (2012.01) |
| *F16H 1/10* | (2006.01) |

(52) U.S. Cl.
CPC ............... *B60J 7/104* (2013.01); *B60J 7/085* (2013.01); *B60J 11/04* (2013.01); *F16H 1/145* (2013.01); *F16H 1/10* (2013.01); *F16H 48/10* (2013.01); *F16H 2048/102* (2013.01)

(58) Field of Classification Search
CPC ............. B60J 7/104; B60J 7/085; B60J 11/04
USPC .......................................................... 296/98
See application file for complete search history.

(56) References Cited

U.S. PATENT DOCUMENTS

| | | | |
|---|---|---|---|
| 5,002,328 A * | 3/1991 | Michel ................ | B60J 7/085 296/98 |
| 6,695,382 B2 * | 2/2004 | Ciferri ................. | B60J 7/085 296/100.14 |

(Continued)

*Primary Examiner* — Joseph D. Pape
(74) *Attorney, Agent, or Firm* — Maginot, Moore & Beck, LLP

(57) ABSTRACT

A drive assembly mounted on a pivot arm for a cover system having a cover supported on an axle for the cover to be wound and unwound, the drive assembly including a housing, a drive motor including a hypoid pinion gear in meshed engagement with a hypoid ring gear, a transfer gear engaged to the hypoid ring gear for rotation therewith, an output gear in meshed engagement with the transfer gear, and an output shaft engaged to the output gear for rotation therewith, the output shaft engaged to the axle to transmit rotation from the drive assembly to the axle. The hypoid ring gear, the transfer gear and the output gear are sized and arranged so that the output gear overlaps the hypoid ring gear, and so that the hypoid pinion gear and the output gear are on the same side of the hypoid ring gear and laterally overlap each other. The hypoid ring gear, the transfer gear and the output gear rotate about mutually parallel axes, and the housing has a height in a direction parallel to the parallel axes of three inches or less.

20 Claims, 23 Drawing Sheets

Related U.S. Application Data a continuation-in-part of application No. 14/562,185, filed on Dec. 5, 2014, now Pat. No. 9,812,923.

(60) Provisional application No. 62/387,563, filed on Dec. 24, 2015, provisional application No. 62/386,294, filed on Nov. 25, 2015, provisional application No. 62/213,052, filed on Sep. 1, 2015, provisional application No. 62/002,641, filed on May 23, 2014.

(56) References Cited

U.S. PATENT DOCUMENTS

| | | | |
|---|---|---|---|
| 2002/0033615 A1* | 3/2002 | Henning | B60J 7/085 296/98 |
| 2003/0193208 A1* | 10/2003 | Ciferri | B60J 7/085 296/98 |
| 2008/0116709 A1* | 5/2008 | Royer | B60J 7/085 296/98 |
| 2018/0043758 A1* | 2/2018 | Merryman | B60J 11/04 |

* cited by examiner

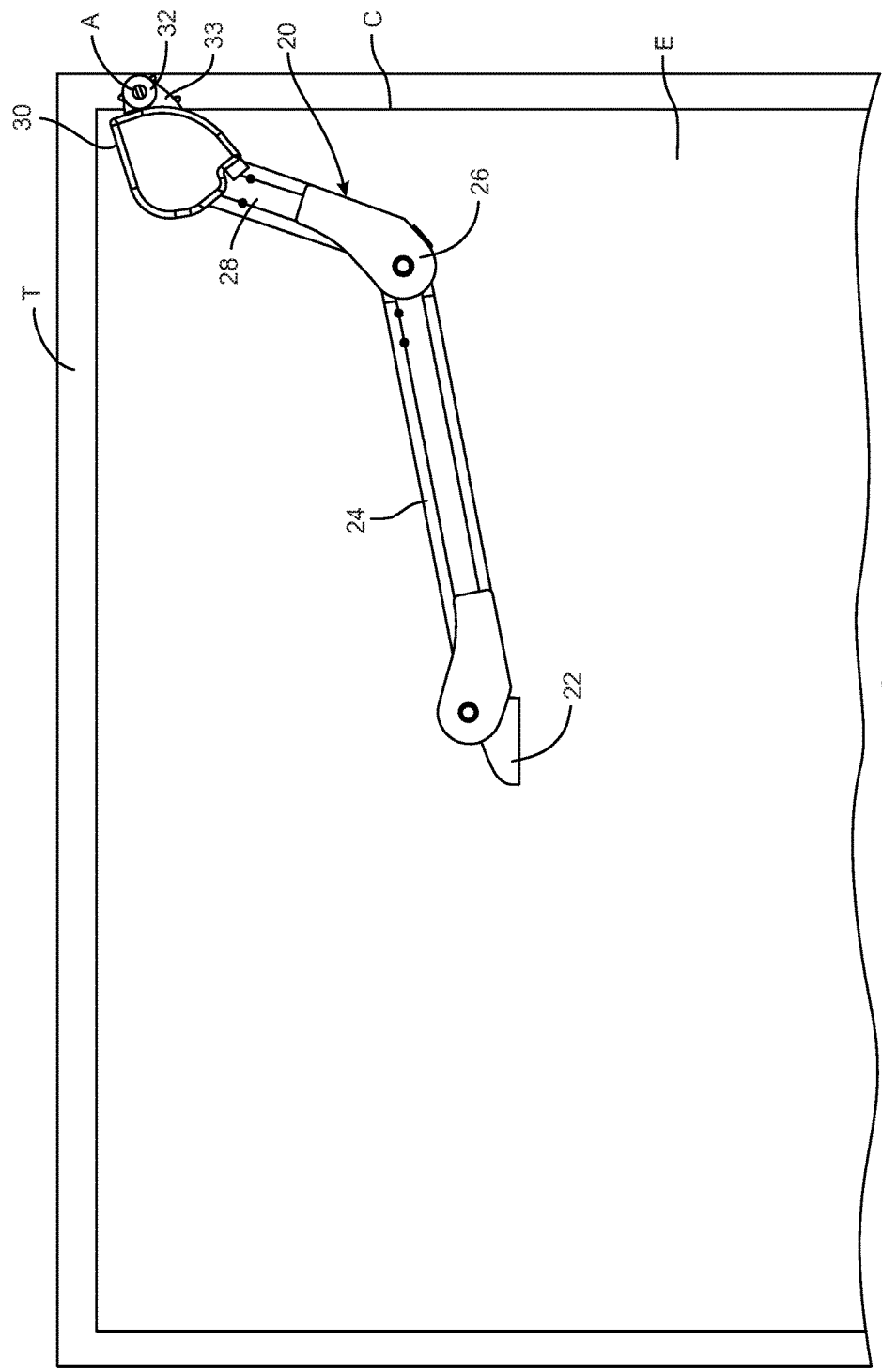

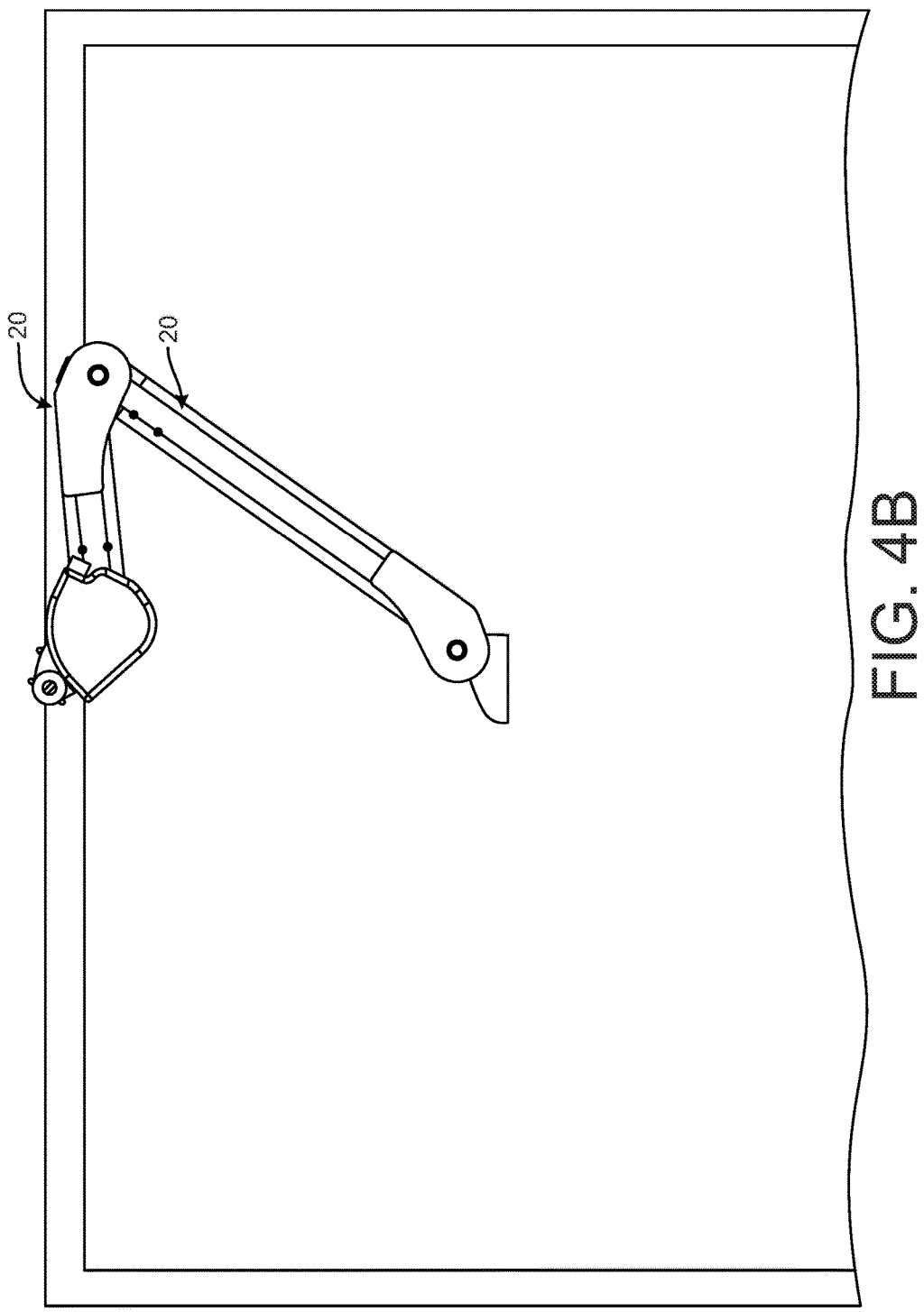

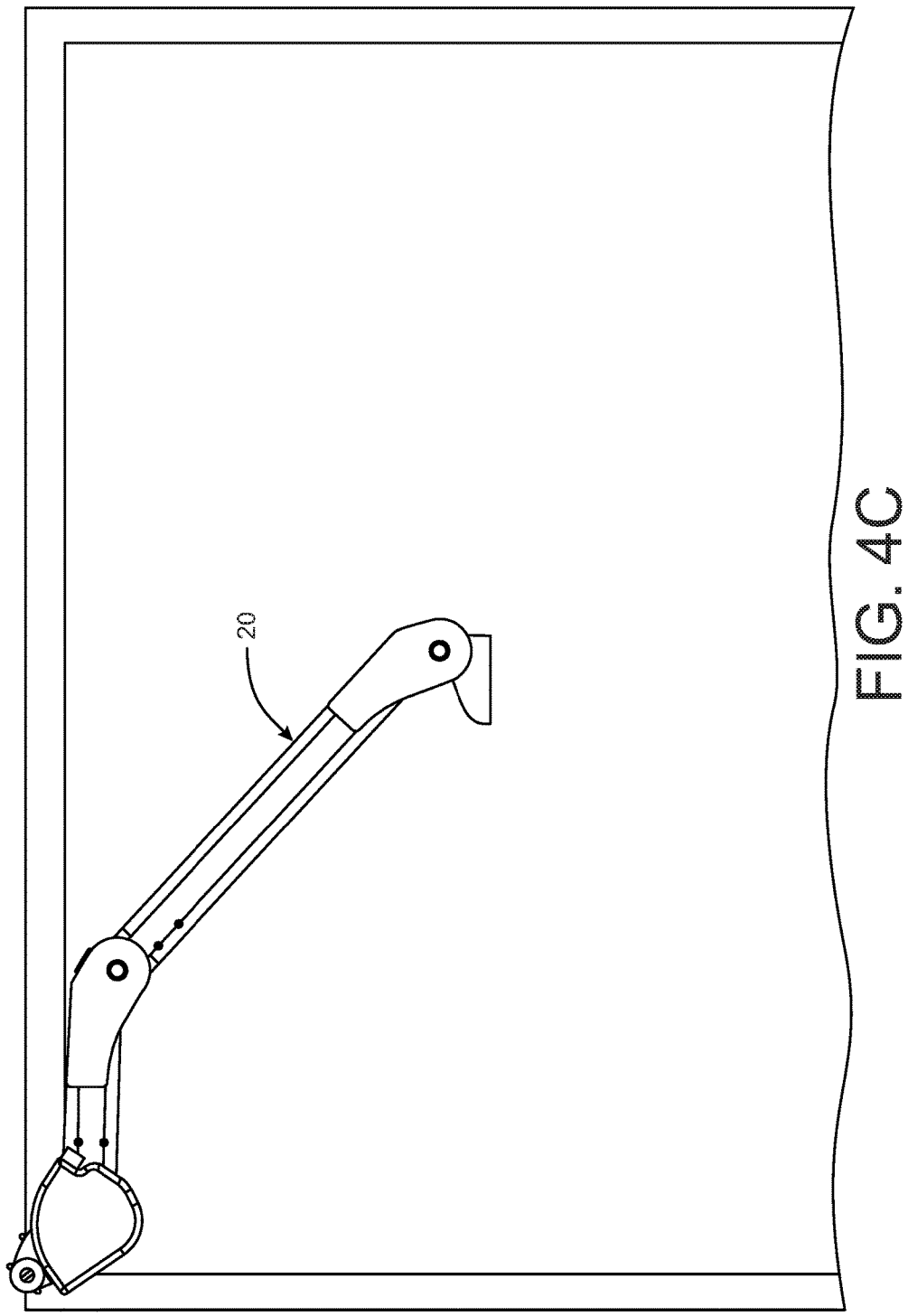

DRIVE ASSEMBLY FOR A COVER SYSTEM FOR OPEN-TOPPED CONTAINERS

REFERENCE TO RELATED APPLICATION

This application is a continuation of and claims priority to co-pending U.S. application Ser. No. 15/811,083 (the '083 application), filed on Nov. 13, 2017, which is a continuation-in-part of and claims priority to co-pending U.S. application Ser. No. 15/252,831, filed on Aug. 31, 2016, the entire disclosure of which is incorporated herein by reference. The '831 application is a utility filing from and claims priority to U.S. Provisional Application No. 62/213,052, entitled "Cover System" and filed on Sep. 1, 2015, to U.S. Provisional Application No. 62/386,294, entitled "Cover System" and filed on Nov. 25, 2015, and to U.S. Provisional Application No. 62/387,563, entitled "Cover System" and filed on Dec. 24, 2015. The entire disclosure of each of these provisional applications is incorporated herein by reference.

The '083 application is also a continuation-in-part of and claims priority to U.S. application Ser. No. 14/562,185, filed on Dec. 5, 2014, entitled "Gear Motor", which issued on Nov. 7, 2017, as U.S. Pat. No. 9,812,923, and which is a utility filing of and claims priority to U.S. Provisional Application No. 62/002,641, filed on May 23, 2014, the entire disclosures of which are incorporated herein by reference.

BACKGROUND

The present disclosure relates to cover systems for open-topped containers, such as dump bodies, refuse haulers, grain trailers and the like, and particularly to drive systems for conveying the cover across the container. These cover systems utilize flexible covers, such as tarpaulins, that are pulled across the open top of the container body. The flexible cover is wound onto a roller as the cover is moved to its open or stowed position and unwound from the roller as the cover is moved to a closed position covering the container body. An arm assembly supports the opposite ends of the flexible to control the movement of the cover to and from its end positions.

An exemplary side-to-side system is depicted in FIG. 1a. The vehicle V includes a tractor T and a trailer body B, which may be a dump body, grain hauler and the like. A tarping system 10 is mounted to the trailer with a cover or tarpaulin 11 sized to extend the entire length of the open top O of the trailer body, and to span the width of the open top when the tarping system is in its closed configuration. A drive mechanism 12 is engaged to a roller supporting the cover 11 that is configured to move the cover from one side of the trailer body B to the other. A support mechanism 13 is engaged to the opposite end of the cover roller to support the cover as it is deployed or retracted. In a typical side-to-side cover system, the drive mechanism 12 rotates the roller and cover so that the cover travels over the end caps C of the trailer body.

A typical front-to-back cover system is shown in FIG. 1b. The cover system 10' is mounted on a vehicle V, which may be a dump truck with a dump body B over which the tarpaulin 11' extends. The cover system 11' includes a bail arm assembly 12' that is connected to one end of the tarpaulin 11' and that may be biased by a spring mechanism 13' toward the covering position shown in FIG. 1b. The tarpaulin is wound onto a roller assembly 14' at one end of the body B'. A drive mechanism 15' mounted to the side of the roller assembly rotates the roller assembly to retract the tarpaulin 11' against the biasing force of the spring mechanism 13'. The drive mechanism 15' includes a motor with its output shaft directly driving the roller assembly 14'.

The design of cover or tarping systems is subject to certain government regulations. One government regulation is that the cover system cannot extend more than three inches beyond the side of the trailer. Another requirement in the art is that the envelop of the cover system be as small as possible in the space between the truck and the trailer. As illustrated by the side-to-side system in FIG. 2a and particularly the front-to-back system in FIG. 3a, prior art mechanisms M for driving the cover system typically project outward from the side of the trailer body B by a dimension $E_{max}$ that exceeds the three inch regulation. The prior art mechanisms M in the side-to-side systems of FIG. 2a also typically project a depth $D_{max}$ from the forward end of the trailer body B. This depth $D_{max}$ is typically seven to fourteen inches which is a significant incursion into the desired space for a headache rack or a cab-mounted storage rack. There is a continuing need for a cover system, whether a side-to-side or a front-to-back system, that is capable of generating the torque profile needed to move a container cover, while still maintaining a package dimension that meets all government width regulations and minimizes the envelop at the front of the trailer.

SUMMARY OF THE DISCLOSURE

A cover system for an open topped container comprises a cover sized to extend across the open top of the container, an axle supporting the cover for the cover to be wound onto and unwound from as the cover is retracted and extended over the open top of the container, and a drive assembly coupled to the axle to provide rotational force to the axle. In one embodiment, the drive assembly is mounted on an arm that is pivotably mounted to the container to pivot the axle of the cover to retract and extend the cover over the open top of the container. In one aspect, the drive assembly defines an interior space and includes a drive motor disposed within the interior space, the drive motor including a drive shaft having a hypoid pinion gear, a hypoid ring gear rotatably supported within the interior space in meshed engagement with the hypoid pinion gear, a transfer gear engaged to the hypoid ring gear for rotation therewith and rotatably supported within the interior space, an output gear in meshed engagement with the transfer gear and rotatably supported within the interior space, and an output shaft engaged to the output gear for rotation therewith, the output shaft engaged to the axle to transmit rotation from the drive assembly to the axle. In one feature of the disclosed cover system, the hypoid ring gear, the transfer gear and the output gear are sized and arranged so that the output gear overlaps the hypoid ring gear, and so that the hypoid pinion gear and the output gear are on the same side of the hypoid ring gear and laterally overlap each other.

In another aspect of the disclosure, a drive assembly is provided for a cover system that can be mounted to a pivot arm of a side-to side cover system or to the body or roller assembly of a front-to-back cover system, and engaged to an axle of the cover. The drive assembly comprises a housing defines an interior space and includes a drive motor disposed within the interior space, the drive motor including a drive shaft having a hypoid pinion gear, a hypoid ring gear rotatably supported within the interior space in meshed engagement with the hypoid pinion gear, a transfer gear engaged to the hypoid ring gear for rotation therewith and rotatably supported within the interior space, an output gear in meshed engagement with the transfer gear and rotatably supported within the interior space, and an output shaft engaged to the output gear for rotation therewith, the output shaft engaged to the axle to transmit rotation from the drive assembly to the axle. In one feature of the disclosed cover system, the hypoid ring gear, the transfer gear and the output gear are sized and arranged so that the output gear overlaps the hypoid ring gear, and so that the hypoid pinion gear and the output gear are on the same side of the hypoid ring gear and laterally overlap each other.

In a further aspect, the hypoid ring gear, the transfer gear and the output gear rotate about mutually parallel axes. The housing has a height in a direction parallel to the parallel axes of three inches or less, so that the drive assembly and cover system using the drive assembly can meet government regulations.

DESCRIPTION OF THE FIGURES

FIGS. 4A-4C are end views of a trailer with a side-to-side cover system with an arm assembly having a drive assembly mounted at the end of the arm assembly to drive the axle of the cover, showing the arm assembly in its two end positions and one intermediate position.

DETAILED DESCRIPTION

Figure 1A:
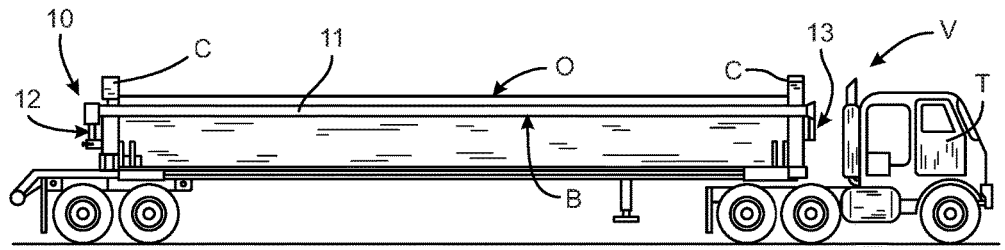
FIG. 1a is a side view of an exemplary side-to-side cover system for the open top of a trailer body.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

FIGS. 4A-4C shows container body B having an open top T and an end wall E. A cover system includes a flexible cover C, such as a tarpaulin, for covering the open top T. In the illustrated embodiment, the cover C is part of a side-to-side cover system in which the cover is moved from its open position shown in FIG. 4A, to a closed position extending across the top T of the container, as shown in FIG. 4C. The cover C is mounted on a roller that is rotated about an axle A. An arm assembly 20 is provided that is configured to control the movement of the cover C between the open and closed positions. In some systems, the axle A is manually rotated, with the movement of the cover being guided by arm assemblies 10 on the front and rear end walls of the container. However, for the purposes of the present disclosure, the axle A is motor driven, as described in more detail herein.

As shown in FIG. 4A, the arm assembly 20 includes a base 22 adapted to be mounted to the container body, a lower arm 24 pivotably mounted to the base, a pivot joint 26, an upper arm 28 pivotably mounted to the pivot joint, and a drive assembly 30 with an axle collar 32 for engaging the axle A of the cover roller. The arm assembly 20 may include transfer gearing 33 from the output of the drive assembly to drive the axle A. The arm assembly 20 is thus configured to operate in a known manner as the arm pivots from the closed position shown in FIG. 4A, through an intermediate position shown in FIG. 4B, to its open position shown in FIG. 4C. The lower arm 24 thus pivots about the base 22 to sweep the arm assembly across the end wall E of the container, and the upper arm 28 pivots about pivot joint 26 to maintain the axle A in close proximity to the top of the container body B.

Figure 3A:
FIG. 3a is a top view of a trailer body with a prior art front-to-back cover system showing the side extension dimensions of the mechanism.
Figure 3B:
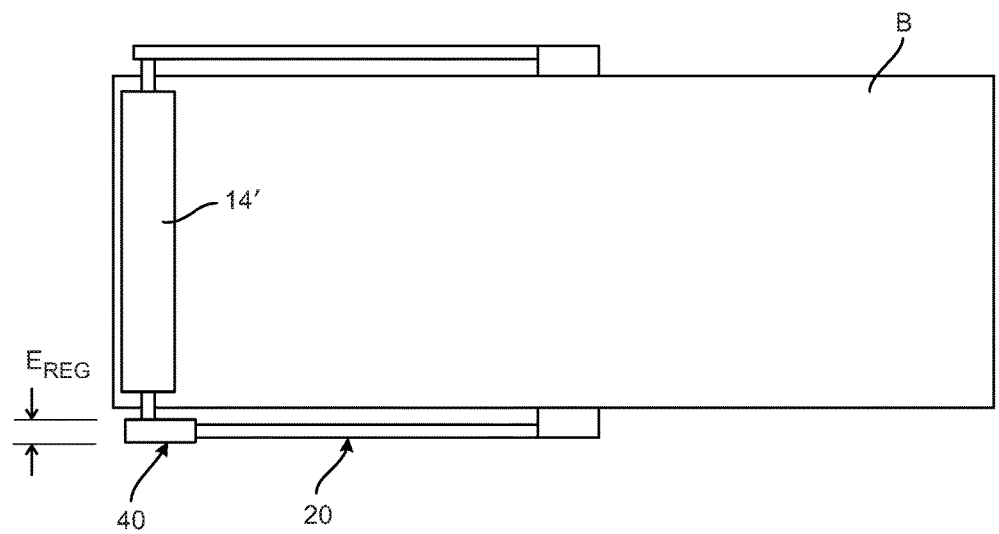
FIG. 3b is a top view of a trailer body with a cover system incorporating a drive assembly according to the present disclosure, showing the side extension dimensions.
Figure 5:
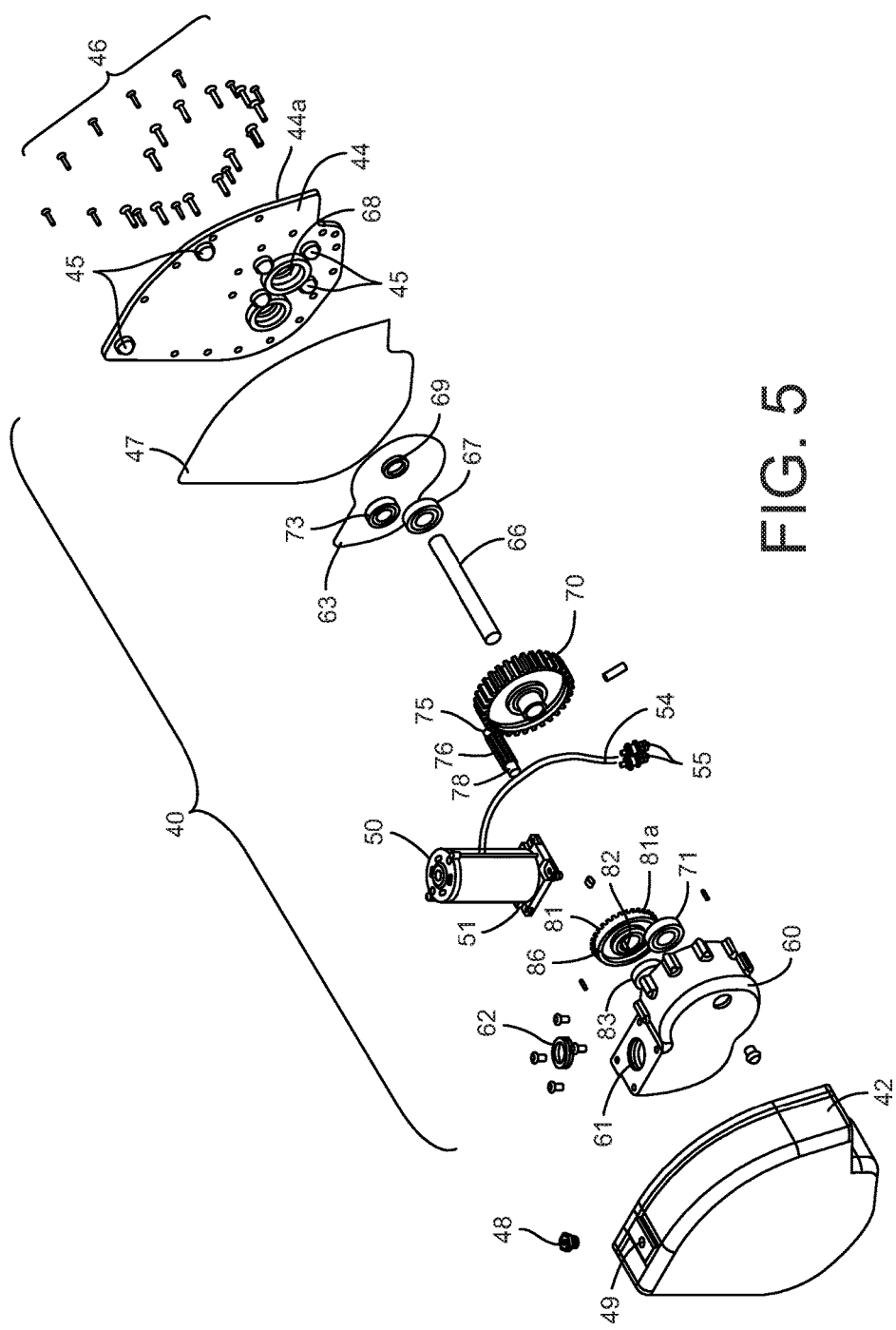
FIG. 5 is an exploded view of a drive assembly according to one aspect of the present invention for mounting on the end of the arm assembly shown in FIGS. 4A-4C.

In accordance with the present disclosure, the drive assembly 30 shown in FIGS. 4A-4C can be replaced with a drive assembly 40, shown in FIGS. 5-12. Although in the illustrated embodiment the drive assembly is incorporated into a side-to-side cover system, it is understood, that the drive assembly 40 disclosed herein can also be used on a "front-to-back" type cover system in which the cover is extended from the front of the container body B to the rear of the body, such as the system shown in FIG. 3b. The drive assembly 40 includes a housing having a housing cover 42 and a corresponding base plate 44 that are configured to minimize the envelope of the drive assembly when mounted at the end of arm assembly 20. In particular, the assembled drive assembly housing has a width of less than three inches. The housing cover and base plate are complementary configured, with the housing cover 42 fastened to the base plate 44 by a plurality of mounting screws 46. The base plate 44 includes a number of protrusions 45 projecting from the inside surface of the plate. The protrusions can be drilled and tapped from the outer surface of the base plate for use in mounting the base plate 44, and thus the drive assembly 40, to another structure, such as an arm assembly or a separate reducer gearbox. The drive assembly 40 includes a seal 47 that can be in the form of a conventional seal ring extending around the perimeter of the housing and cover plate.

Figure 7:
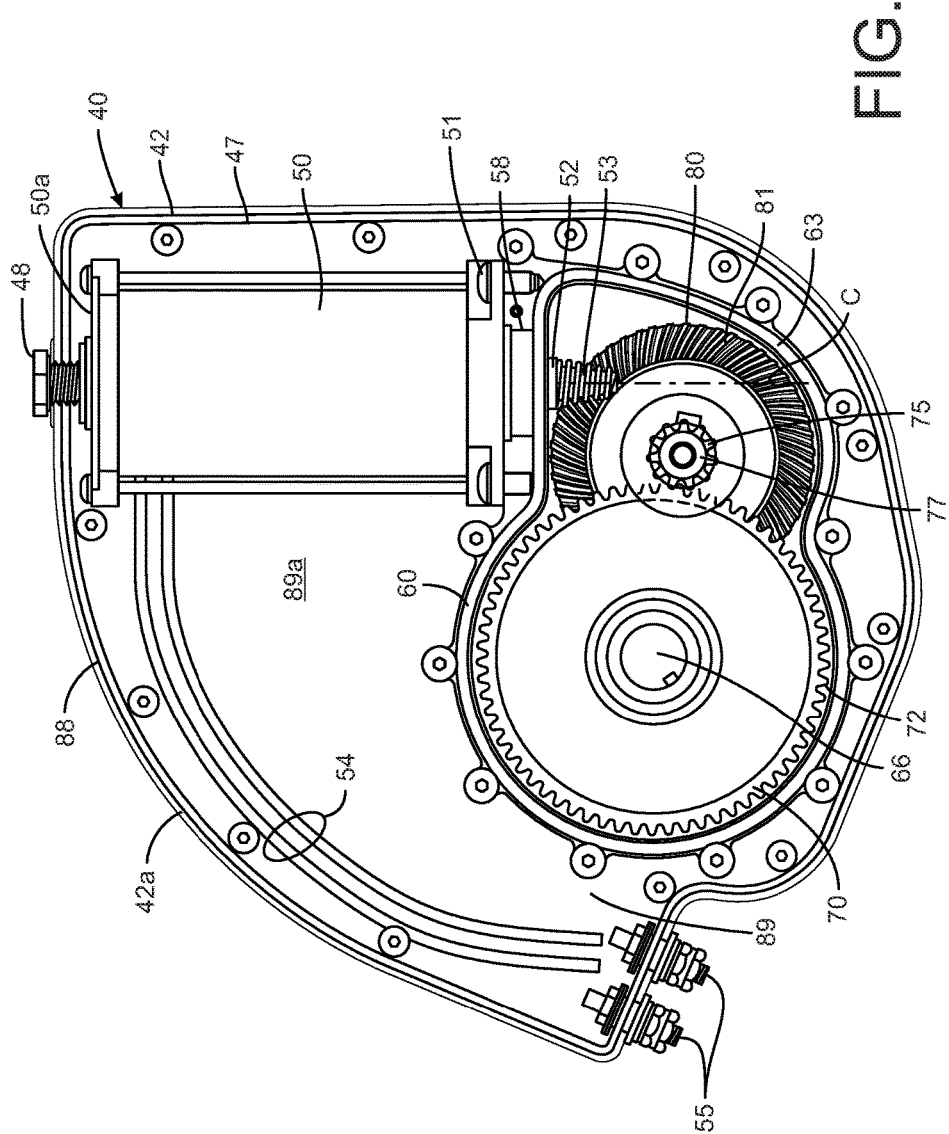
FIG. 7 is a top view of the drive assembly shown in FIG. 6 with the base plate removed.
Figure 8:
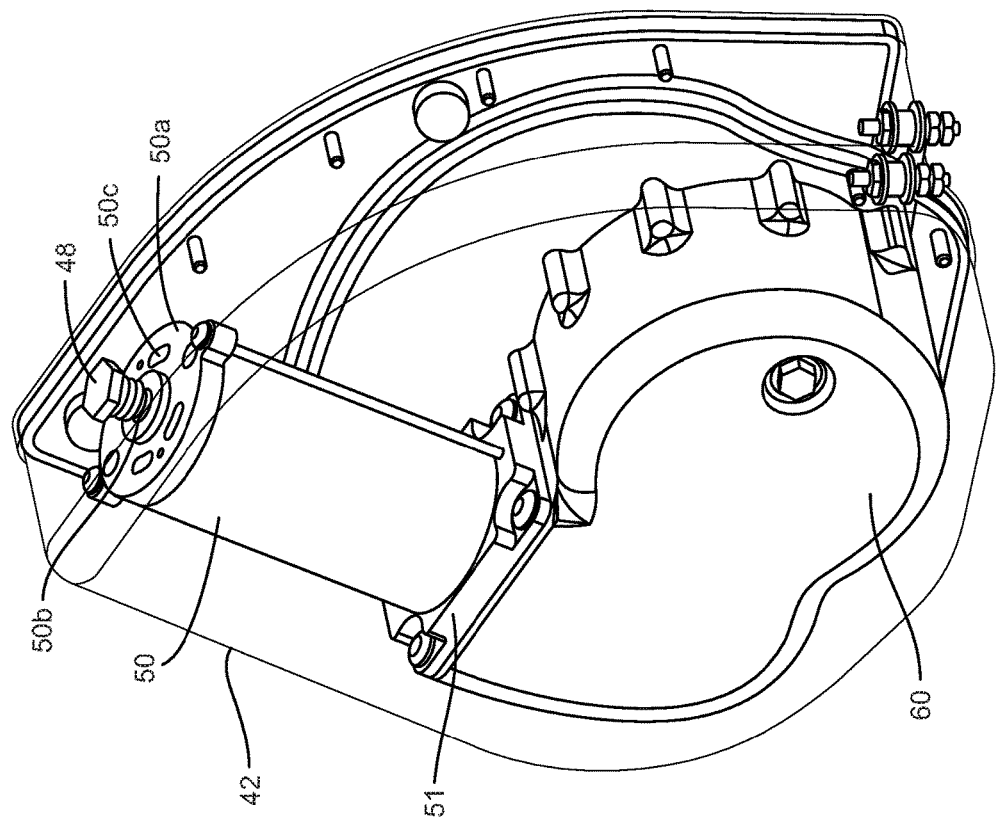
FIG. 8 is a side perspective view of the assembled drive assembly shown in FIG. 5 with the housing cover shown in phantom.
Figure 9:
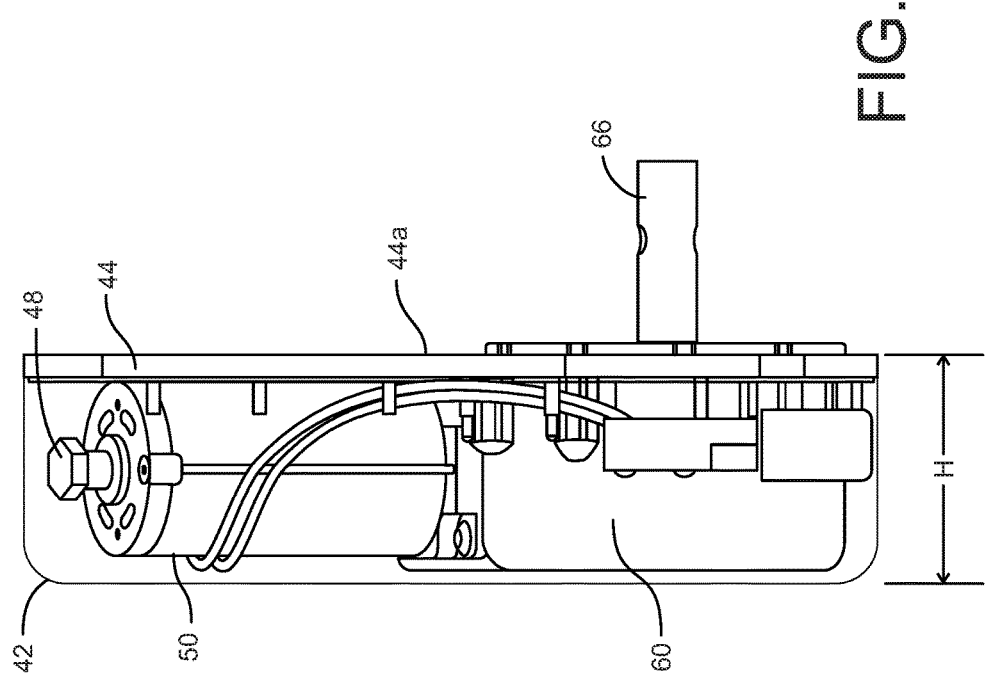
FIG. 9 is a side view of the assembled drive assembly shown in FIG. 8.
Figure 12:
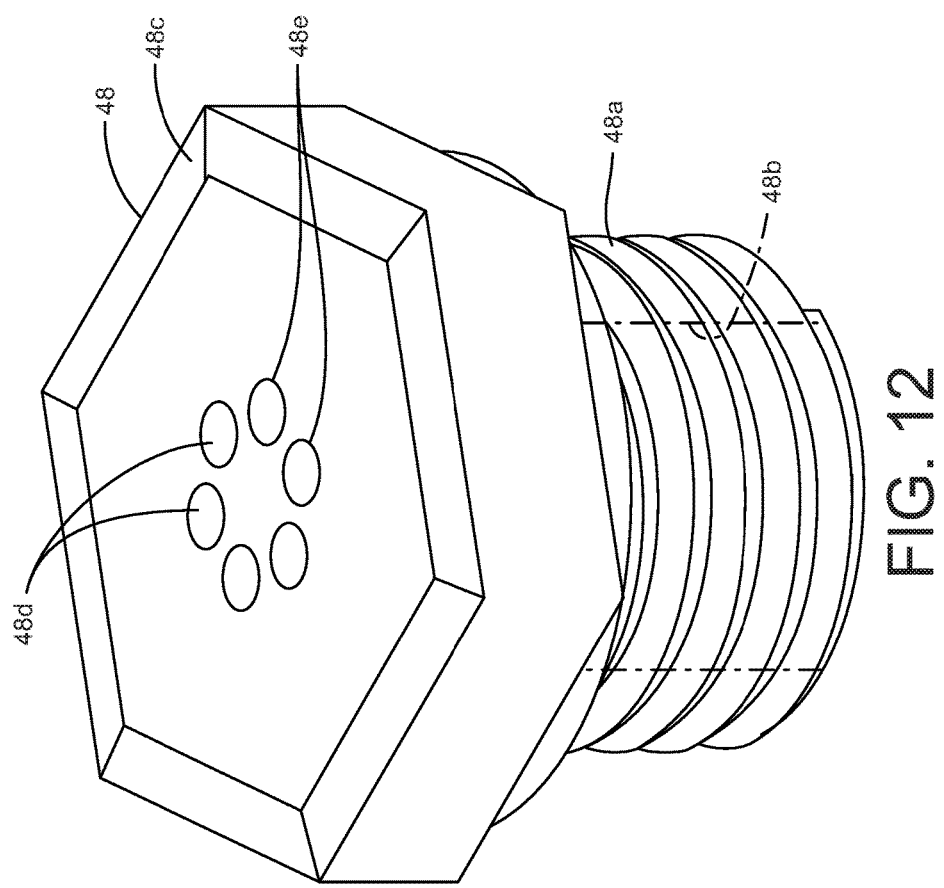
FIG. 12 is an enlarged perspective view of a permeable seal of the drive assembly shown in FIG. 5.
Figure 13:
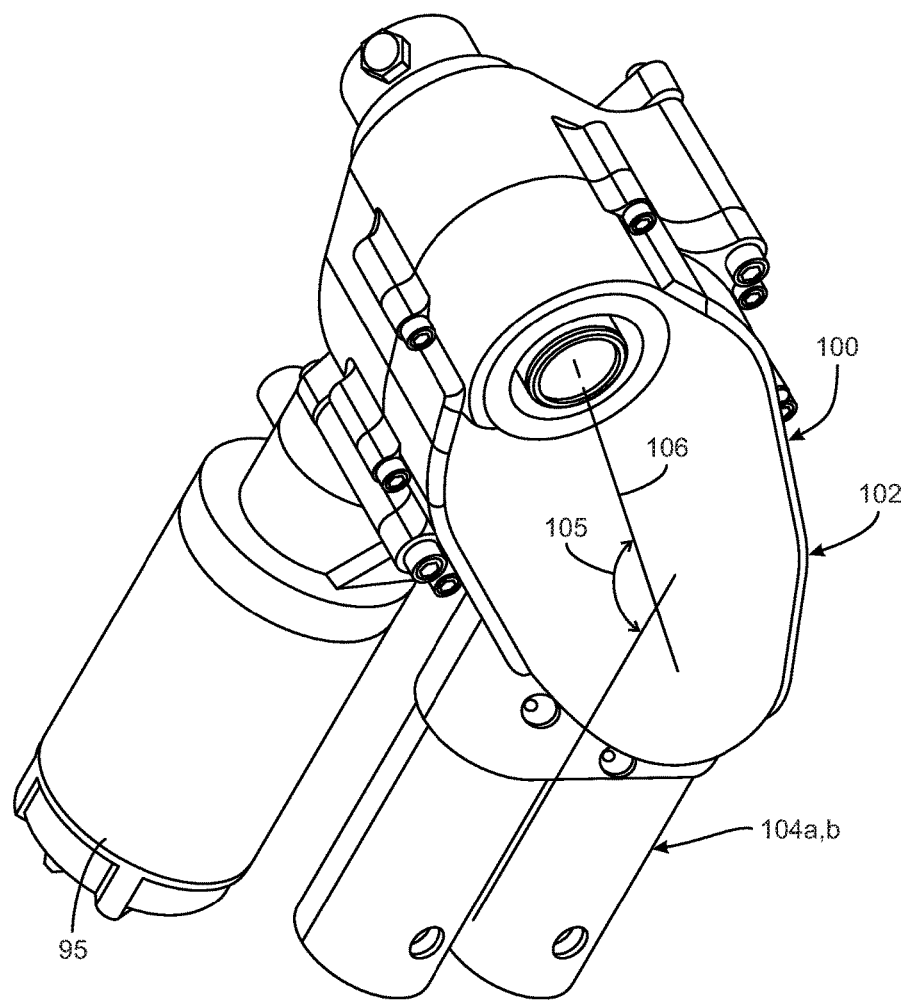
FIG. 13 is a side perspective view of a gear assembly and drive motor according to another embodiment of the present disclosure, for use with a cover system as shown above.
Figure 14:
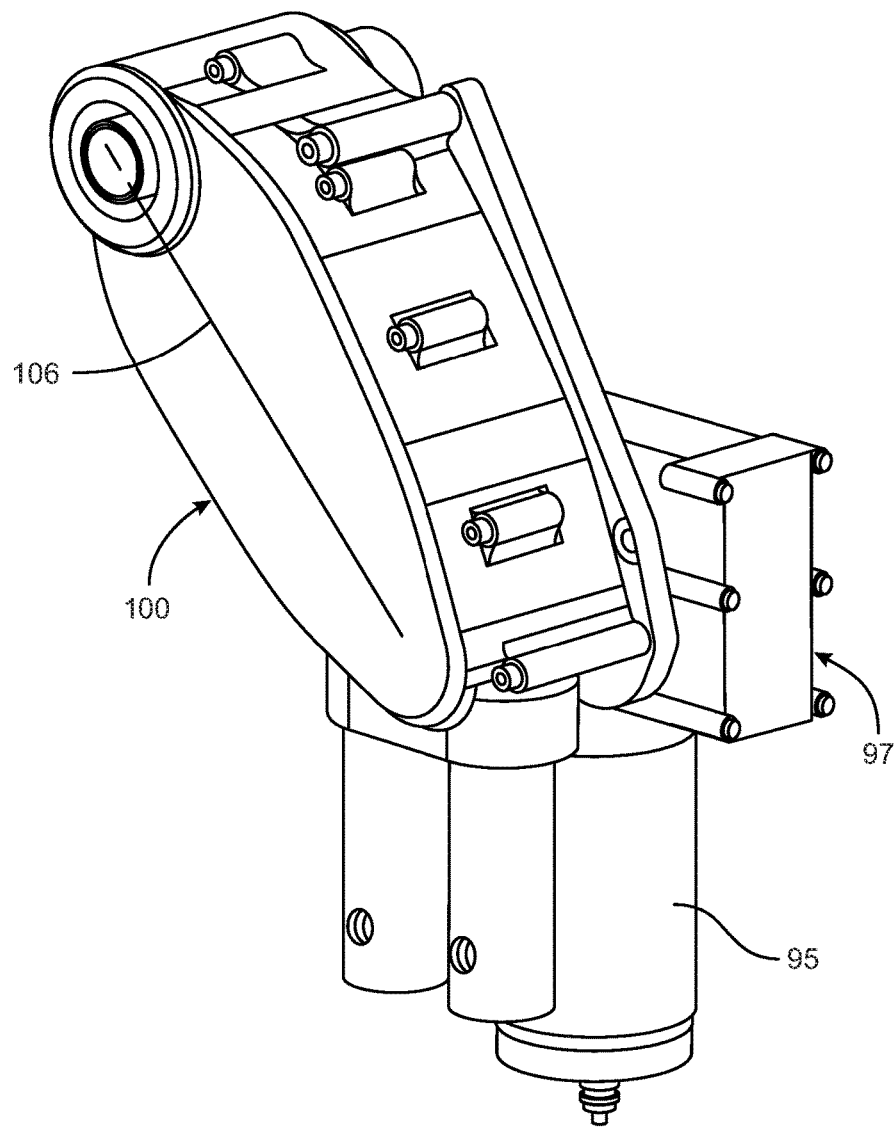
FIG. 14 is an end perspective view of the gear assembly and drive motor shown in FIG. 13.
Figure 15:
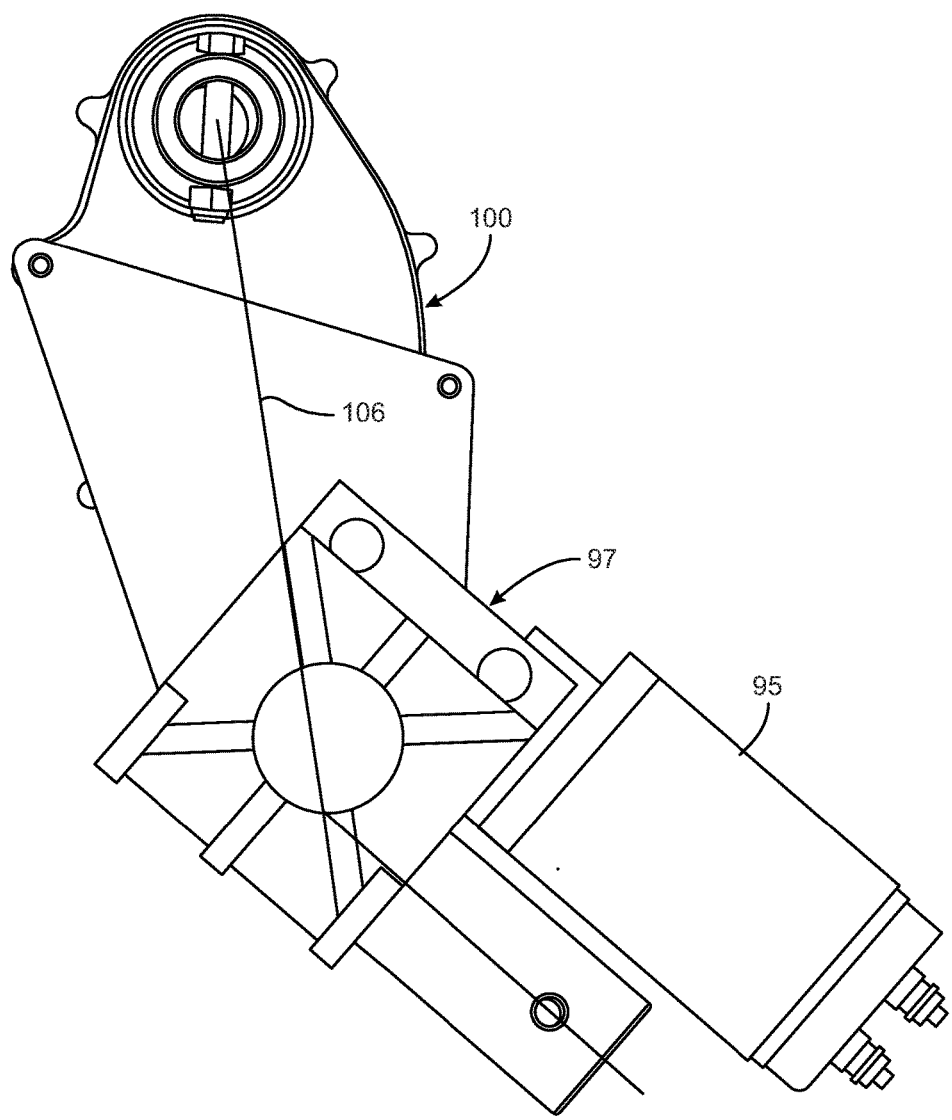
FIG. 15 is an opposite side view of view of the gear assembly and drive motor shown in FIG. 13.
Figure 16:
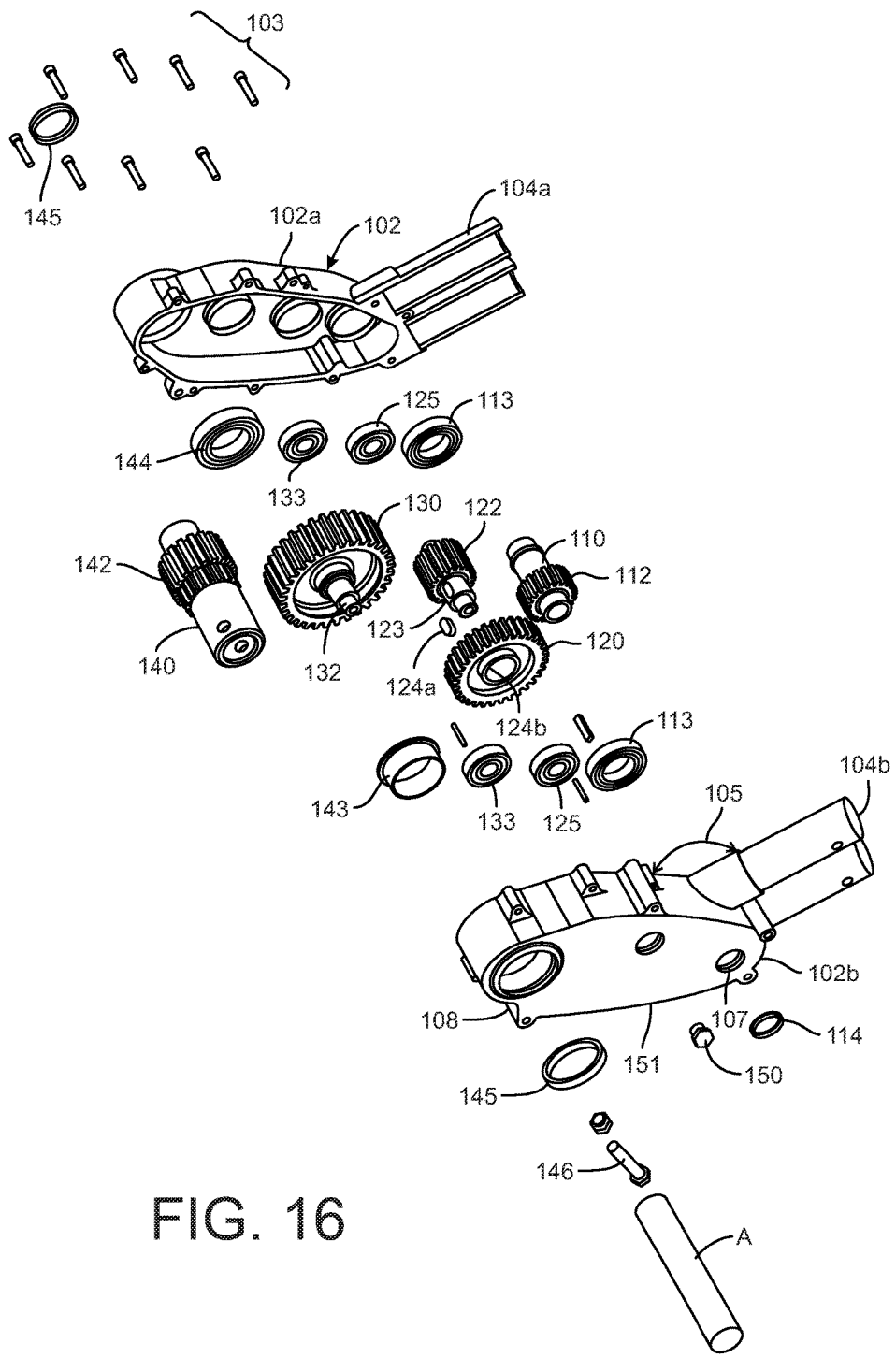
FIG. 16 is an exploded view of the gear assembly shown in FIG. 13.
Figure 17:
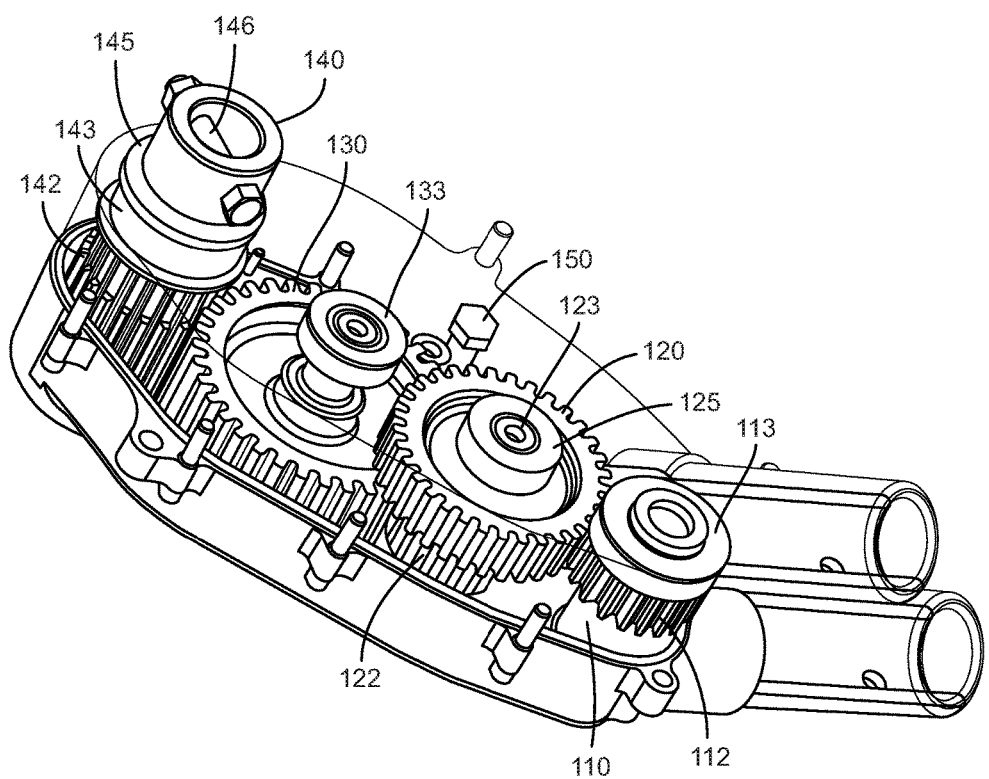
FIG. 17 is a partial cut-away view of the assembled gear assembly shown in FIG. 16.
Figure 18:
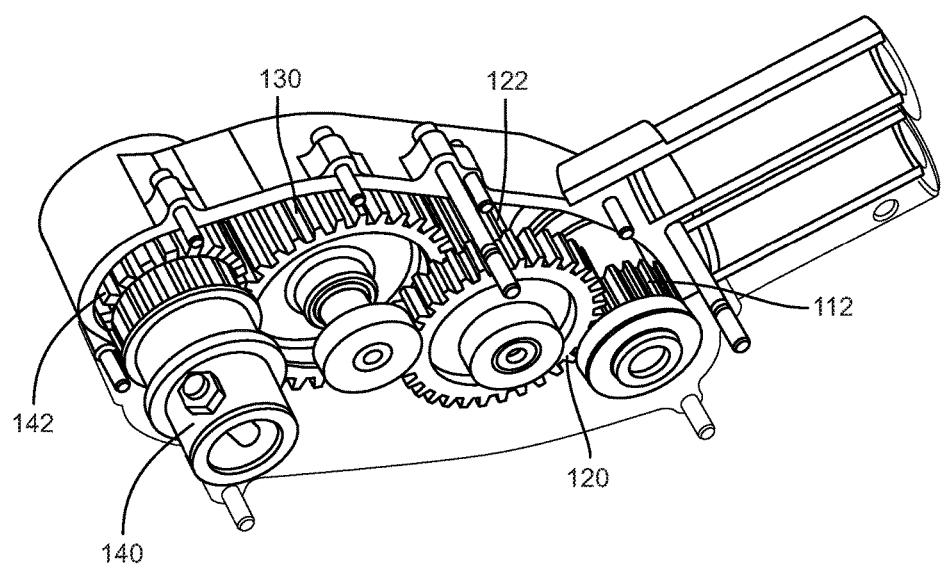
FIG. 18 is a further partial cut-away view of the assembled gear assembly shown in FIG. 16.
Figure 19:
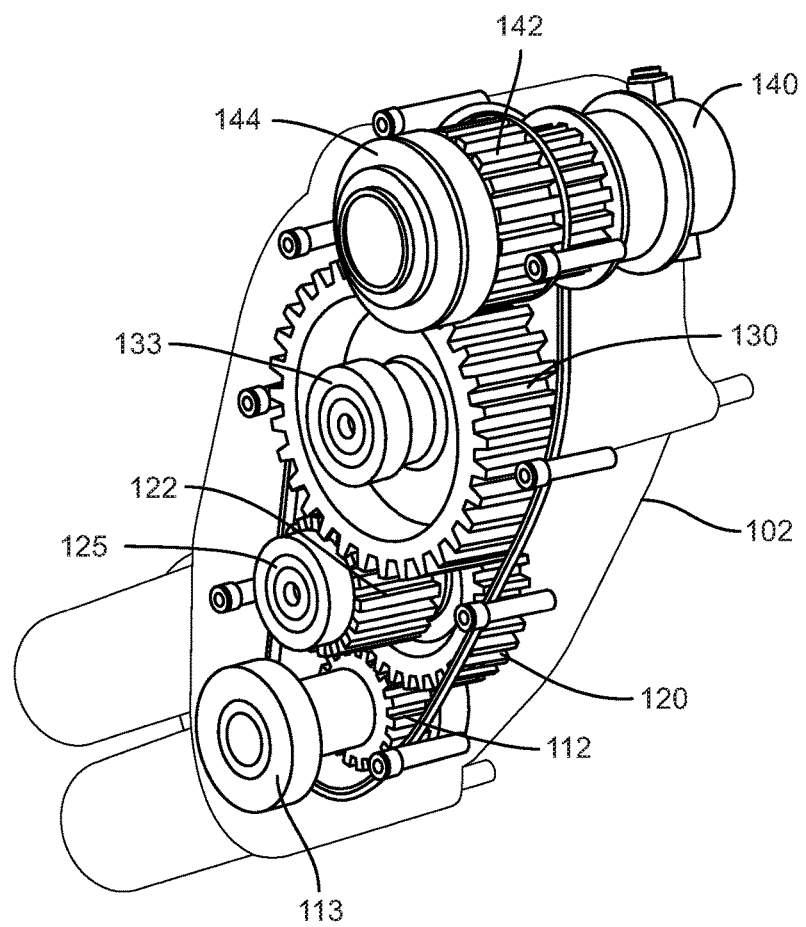
FIG. 19 is another partial cut-away view of the assembled gear assembly shown in FIG. 16.
Figure 20:
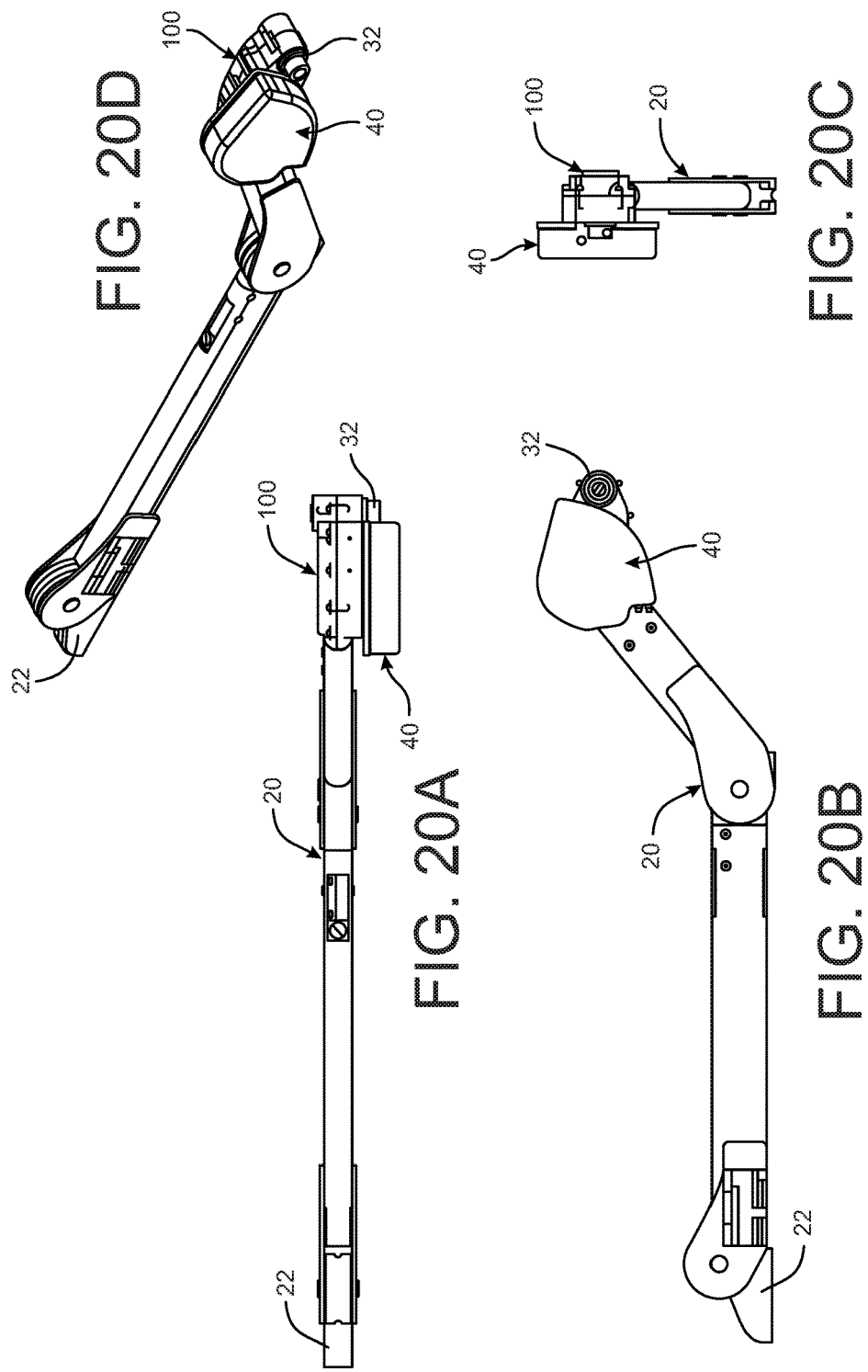
FIGS. 20a-20d are top, side, end and perspective views of a drive cover system in a further aspect of the invention combining the gearbox and motor of the drive assembly shown in FIG. 5 with the gear assembly shown in FIG. 16.

In a further aspect of the drive assembly disclosed herein, the housing cover 42 defines an opening 49 at the top of the housing cover. A permeable seal 48 is mounted within the opening. The seal 48 can include a threaded stem 48b configured to engage threaded within the opening 49 as shown in FIG. 12. The stem defines a bore 48b to the cap 48c, which defines a plurality of openings 48d in communication with the bore 48b. The permeable seal 48 thus provides a flow path from the interior of the housing, formed by the housing cover 42 and the base plate 44, to the outside to allow discharge of air within the housing that is heated by operation of the motor. The seal 48 includes a sealing element 48e that covers each of the openings 48d and that is permeable to air but impermeable to water. In one specific embodiment, the seal 48e is a GORE-TEX® material. The sealing element 48a thus allows the interior of the assembly 40 to "breathe" while preventing the outside elements from infiltrating the housing. As can be appreciated from the views in FIGS. 7-8, the permeable seal 48 is aligned with the end plate 50a of the motor 50. The end plate 50a can include a plurality of ventilation openings, such as openings 50c or side openings, for venting air from within the motor that is heated during operation of the motor. The seal 48 is particularly aligned with an access opening 50b in the end plate 50a of the motor, as best seen in FIG. 8. The access opening 50b provides access to the end of the motor drive shaft 52 which includes a mating interface at the end of the shaft for mating with a conventional manual driving tool, such as a Phillips screwdriver or a hex wrench. When the seal 48 is removed from the housing opening 49 the operator can insert a driving tool, such as a screwdriver, through the housing opening 49 and access opening 50b to engage the mating interface at the end of the motor shaft. This allows the operator to manually rotate the motor shaft and the hypoid pinion gear 53, and the gear assembly and output shaft 66 (described below), to manually rotate the cover axle A in the event of a motor failure.

Returning to FIG. 5, the drive assembly 40 further includes a drive motor 50 mounted within the housing cover 42. The drive motor 50 may be an open fan motor with a fan to direct heated air out the ventilation openings 50b into a chamber 89a within the interior space 89. The permeable seal 48 allows heated air that expands within the chamber 89a to vent from the housing, as well as air to be drawn into the housing as the air within the chamber cools and contracts. The permeable seal 48 thus helps equalize the gas pressure inside the housing.

The drive motor 50 is electric, so the electrical wires 54 pass through the interior space 89 of the housing cover to electrical contacts 55 fastened to the housing cover for access outside the housing cover. The drive motor is fastened to a mounting plate 51 that is used to mount the motor to an interior gear assembly housing 60 that houses the gearing to gear down the motor output speed to a suitable speed and multiply the torque to a suitable torque for driving the axle A of the cover for the cover system. The drive shaft 52 of the motor includes a tapered single start hypoid gear pinion 53, as shown best in FIGS. 6-7. An oil seal 58 may be provided between the mounting plate 51 for the motor 50 and the gear assembly housing 60 to prevent oil migrating from the gear assembly to the motor or into the interior space 89 of the housing.

The drive shaft 52 of the motor projects through an opening 61 in a gear assembly housing 60. The gear assembly housing contains the step-down gearing between the motor drive shaft 52 and the output shaft 66. The housing 60 thus isolates the gearing from the interior of the housing cover 42, as best seen in FIG. 8. The gear assembly housing 60 is fastened to the base plate 44 using fasteners 46. A seal, in the form of seal ring 63, is clamped between the gear assembly housing and the base plate to maintain an oil-tight seal to contain the oil lubricating the gearing within the housing cover.

Figure 10:
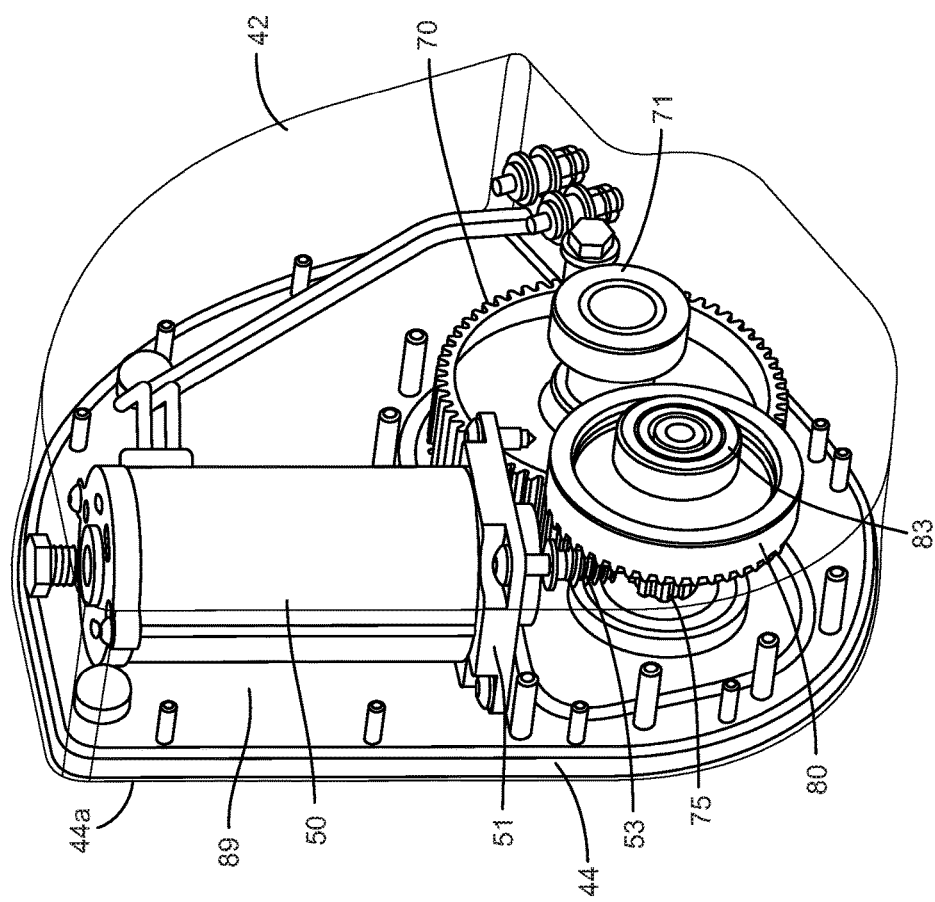
FIG. 10 is an opposite side perspective view of the assembled drive assembly shown in FIG. 5, with the housing cover shown in phantom.

The gearing within the gear assembly reduces the high speed motor drive shaft to a suitable speed for rotating the axle A of the cover. Thus, in one embodiment, the gearing achieves a 281:1 reduction. The output shaft 66 is rotationally coupled to an output gear 70. The shaft is supported by a shaft bearing 67 and extends through an opening 68 in the output face 44a of the base plate 44. A shaft seal 69 seals the output shaft opening 68 primarily to prevent lubricating oil for the gearing from leaking out of the housing, and secondarily to prevent debris and water from entering the housing. The output gear 70 is supported by a bearing 71 (FIG. 10). In one specific embodiment, the output gear 70 is a 62 tooth spur gear.

The output gear 70 meshes with a transfer gear 75, which may be in the form of a spindle gear having a spindle shaft 78. The spindle shaft 78 is rotationally coupled to a ring gear 80 by a keyed interface 79. The transfer gear 75 includes a spindle portion 77 that is supported by a bearing 73 within the gear assembly housing 60. The transfer gear 75 includes spur gear teeth 76. In the illustrated embodiment the transfer gear has 11 teeth.

The ring gear 80 includes hypoid teeth 81 on a surface 81a facing the base plate 44 for meshing with the hypoid pinion 53 of the motor drive shaft 52. The hypoid pinion thus meshes with the hypoid ring gear in a position between the ring gear and the output face of the drive assembly. In the specific embodiment the hypoid interface is self-locking, meaning that the ring gear and drive shaft gear will lock so that the output shaft 66 will hold its position when the motor stops rotating. In one embodiment, the self-locking hypoid gear interface can be at least 30:1 ratio between the hypoid teeth 80 and 53. In the specific embodiment the ratio is 50:1. Other details of certain embodiments of the hypoid gear set are found in co-pending U.S. application Ser. No. 14/562,185, incorporated by reference above, which further details are incorporated by references herein.

The motor and gear train are configured to allow the entire drive assembly to fit within a three-inch width. Consequently, the housing has a height H (FIG. 9) that is three inches or less. This height H allows the motor assembly 40 to be used in the front-to-back cover system shown in FIG.

Figure 6:
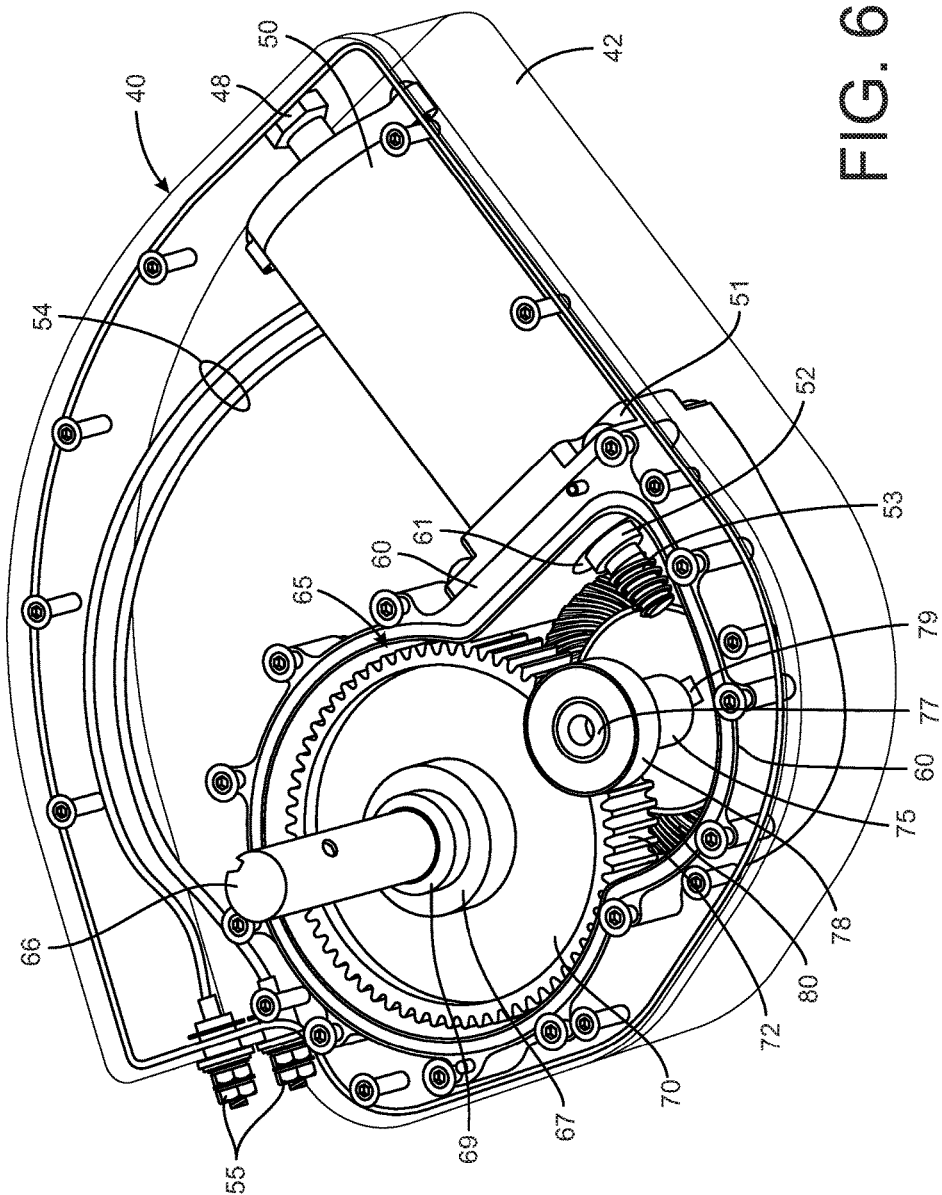
FIG. 6 is a perspective partial cut-away view of the assembled drive assembly shown in FIG. 5, with the housing cover and base plate shown in phantom.
Figure 11:
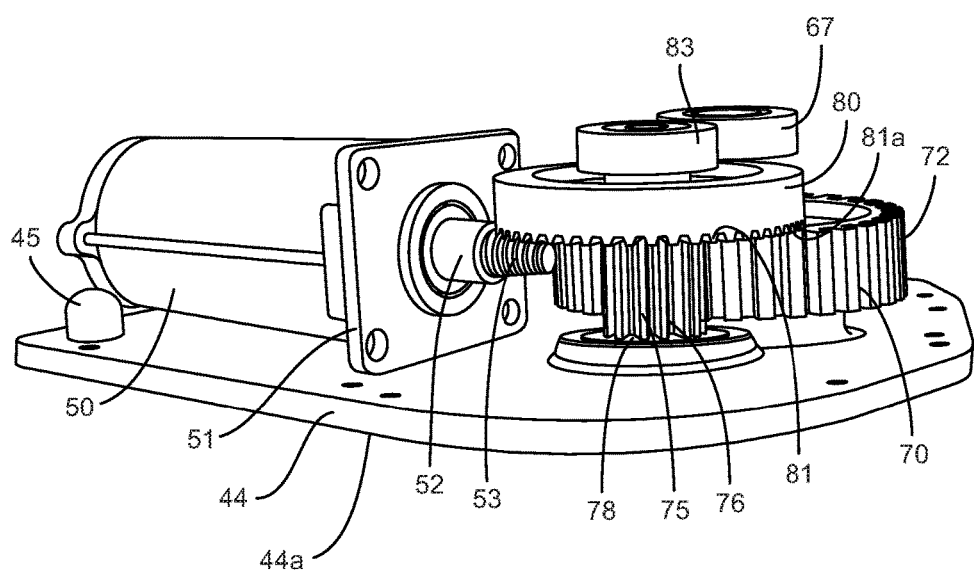
FIG. 11 is a side view of the drive assembly shown in FIG. 10, with the cover and the gear box housing removed.

3b with the motor assembly extending laterally from the side of the body B or roller assembly 14', but still fall within the government width regulations. To accommodate this narrow width, the gears are arranged as best seen in FIGS. 6, 10 and 11. In particular, the hypoid ring gear 80 is situated above, in relation to the output face 44a of the base plate 44, and overlapping the output spur gear 70. The transfer gear 75 extends from the ring gear 80 adjacent to and in meshed engagement with the spur gear. The motor 50 is arranged on the base plate 44 so that the hypoid pinion gear 53 is, in relation to the output face 44a of the base plate 44, underneath the hypoid ring gear, laterally overlapping both the output gear and the transfer gear. In other words, the output gear 70, transfer gear 75 and hypoid pinion gear 53 are all on the same side of the surface 81a of the hypoid ring gear facing the base plate 44 in the direction of the output face 44a of the drive assembly. Moreover, the output gear 70 is essentially on the same plane as a plane passing through the longitudinal axis of the hypoid pinion gear 53. This arrangement allows the drive assembly to meet the three-inch DOT width regulation.

The hypoid pinion gear meshes with the hypoid ring gear skew in relation to the radius of the gear. As seen in FIG. 7, the hypoid pinion gear intersects the ring gear along a chord C defined at about one-half the radius of the ring gear. This arrangement of the hypoid gearing allows the motor 50 to be aligned generally perpendicular to a line between the axes of rotation of the output gear and the ring gear.

Even with room for the thickness of the housing cover 42 and base plate 44, and room for the bearings 67, 71, 73 and 83, the drive assembly of the present disclosure still falls within the three-inch width limit, and is still capable of providing the speed and torque necessary to move a cover system, such as the side-to-side cover system shown in FIG. 1. Thus, as depicted in the comparison FIG. 3b, the motor assembly 40 maintains the extension of the drive assembly to the three-inch regulation $E_{reg}$ which is significantly less than the $E_{max}$ of the prior art system shown in FIG. 3a. When used in a side-to-side system, the rear extension of the assembly incorporating drive assembly 40 is $D_{min}$, as shown in FIG. 2b, which is significantly less than the $D_{max}$ of the prior art system shown in FIG. 2a.

The housing cover 42 is further configured to provide an enlarged interior space 89 (FIG. 7) which in turn creates an enlarged air chamber 89a outside the motor 50 and the gear assembly housing 60. As reflected in FIG. 7, the drive motor 50 intersects the gear assembly housing 60 generally perpendicularly. The housing cover 42 is includes an arcuate wall 42a extending from the end plate 50a of the drive motor to the electrical contacts 55 adjacent one end of the gear assembly housing 60. Thus, rather than follow the contour of the drive motor and gear assembly housing the arcuate wall 42a extends away from these two components to create the enlarged air chamber 89a. In one embodiment, the arcuate wall 42a is defined at a radius measured from the axis of the transfer gear shaft 78 of eight to ten inches. This enlarged air chamber 89a facilitates cooling the motor by allowing air to circulate around the chamber so that heat is wicked out of the circulating air into the surrounding structure. To assist in heat transfer from the circulating heated air to the surrounding structure, the housing cover 42 and base plate 44 may be formed of aluminum to act as a heat sink for the heated air circulating within the air chamber 89a. All of these features combine to provide optimum cooling for the motor 50. Although the enlarged air chamber does impact the overall envelop of the drive assembly 40, the overall increase in size does not impact the three-inch width.

Figure 1B:
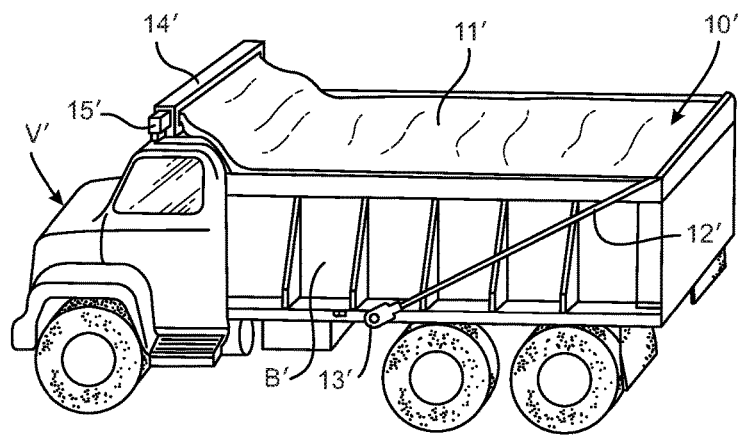
FIG. 1b is a side perspective view of an exemplary front-to-back cover system for an open top body.
Figure 2A:
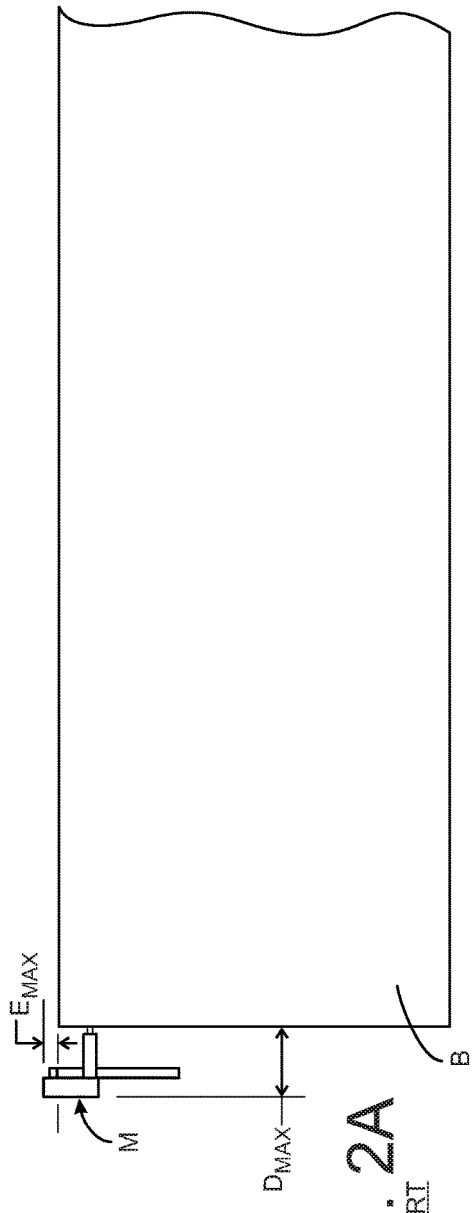
FIG. 2a is a top view of a trailer body with a prior art cover mechanism showing the depth and side extension dimensions.
Figure 2B:
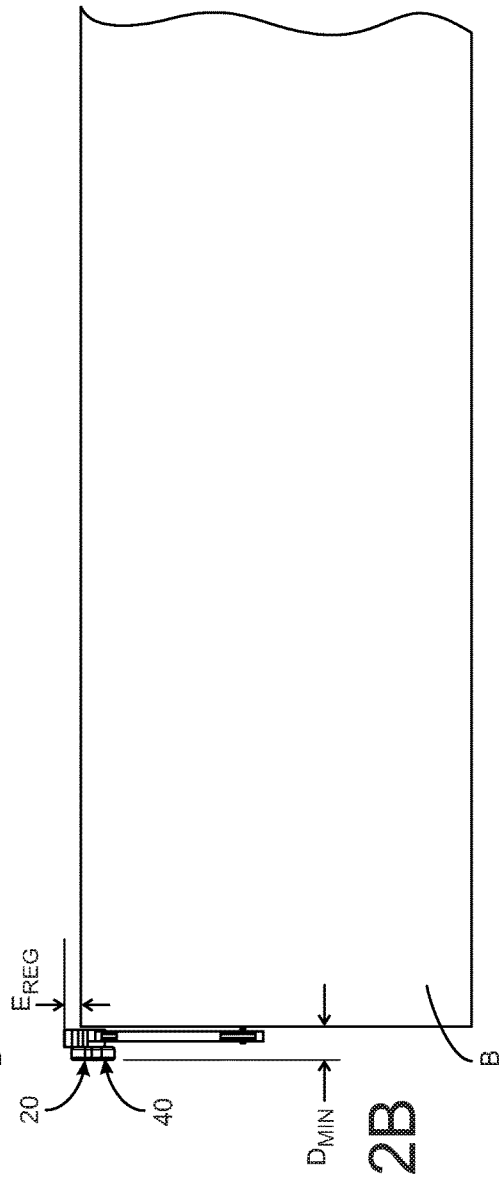
FIG. 2b is a top view of a trailer body with a cover mechanism incorporating a drive assembly according to the present disclosure, showing the depth and side extension dimensions.

As suggested above, the motor assembly 40 can be integrated into a front-to-back cover system, such as the system 10' shown in FIG. 1b. In this case, the housing cover 42 is not mounted to the arm assembly 20 (as with the side-to-side system discussed above), but is instead mounted directly to the side of the body B or to the side of the housing for the roller assembly 14' (FIG. 1b). The drive shaft 52 of the motor may then be directly connected to the roller of the assembly about which the tarpaulin is wound in the retracted configuration. In this embodiment, the axle supporting the cover or tarpaulin, as well as the motor assembly, are fixed in relation to the pivoting arm assembly—i.e., the axle and motor assembly do not pivot with the arm assembly. The housing cover 42 and ultimately the entire motor assembly 40 can be mounted so that the electrical contacts 55 are accessible toward the front of the body B.

In another aspect of the present disclosure, a gear assembly 100 shown in FIGS. 13-19 is provided for engagement to the axle A of a cover system for operation as described above. The gear assembly 100 includes a housing 102 to which a drive motor 95 and drive gear assembly 97 is engaged. The drive motor is preferably a closed electric motor. The drive gear assembly 97 includes right-angle or bevel gearing to convert the rotation of the motor drive shaft to a perpendicular rotation for interfacing with the gearing within the gear assembly 100. The housing 102 may include a permeable seal 150 similar to the permeable seal 48 of the motor assembly 40. The permeable seal 150 allows the housing 102 to "breathe" as air within the housing expands from heating during operation of the gearing within the housing, while preventing water and debris from entering the housing.

The housing 102 includes two housing halves 102a, 102b that are fastened together with suitable fasteners 103. The housing halves further define mating stem halves 104a, 104b that when combined can engage the bail arm or pivot arm of a cover system, such as the arm assembly 20 described above. In one feature of the gear assembly 100 disclosed herein, the mating stem halves are arranged at an angle 105 relative to a centerline 106 through the gear assembly, in which the centerline extends from the axis of the input rotation from the drive motor to the axis of the output rotation to the cover axle A. In one embodiment, this angle 105 is 135-150°. This angle allows the overall gear assembly to fit within the three-inch limit for extension beyond the side of trailer body B (see FIG. 2b), while still allowing the housing 102 to be large enough to fit the gearing necessary to gear down the rotational speed of the drive motor 95 to the requisite rotational speed and torque for the cover axle A.

The gear assembly 100 includes pinion gear 112 having a pinion input shaft 110 that can mate with the output from the drive gear assembly 97, or alternatively directly to the output of the drive motor 95, to rotate the pinion gear 112. The pinion shaft 110 is supported by bearings 113 and the opening 107 in the housing 102 is provided with a seal 114. The pinion gear 112 meshes with first intermediate gear 120 which is coupled for rotation with a second intermediate pinion gear 122. The second intermediate pinion gear 122 includes a pinion shaft 123 that is engaged to the first intermediate gear 120 by a rotating coupling 124a, 124b which can be of known design to fix the rotation of the two intermediate gears 120, 122. The pinion shaft 123 is supported by bearings 125.

The second intermediate pinion gear 122 meshes with an idler pinion gear 130, which in turn meshes with an output pinion gear 142 formed on an output pinion shaft 140. The idler pinion gear 130 is supported on an idler pinion shaft 132, which is in turn supported by bearings 133. The output pinion shaft 140 is supported at one end by a bearing bushing 143 and at an opposite end by a bearing 144. The output pinion shaft 140 extends through an opening 108 in the housing to mate with the axle A of the cover. A seal 145 is provided at the opening 108. An engagement bolt 146 mates the output pinion shaft 140 to the axle A. In the illustrated embodiment, the gears 112, 122, 130 and 142 are one-piece pinion gears; however, it can be appreciated that the pinion gears can be replaced by other suitable gears, provided the same gearing relationship is maintained.

In one embodiment, the gearing in the gear assembly 100 is arranged so that the gearing is limited to a two gear width, with the input pinion gear 112 and first intermediate gear 120 at one level and the second intermediate pinion gear 122, idler pinion gear 130 and output pinion gear 142 at a second level. The idler pinion gear overlaps the first intermediate gear 120 to engage the second intermediate pinion gear to provide space for meshed engagement between the second intermediate pinion gear 122 and the output pinion gear 142, since the second intermediate pinion gear 122 has a smaller outer diameter than the first intermediate gear 120. In one embodiment, the input pinion gear, second intermediate pinion gear and output pinion gear can be 18 tooth spur gears, while the first intermediate gear can be a 34 tooth spur gear. The number of teeth of the idler pinion gear is not critical except to ensure that the second intermediate pinion gear creates enough of a gap between the output pinion shaft 140 and the first intermediate gear 120 so that the two components do not interfere with one another.

Figure 21:
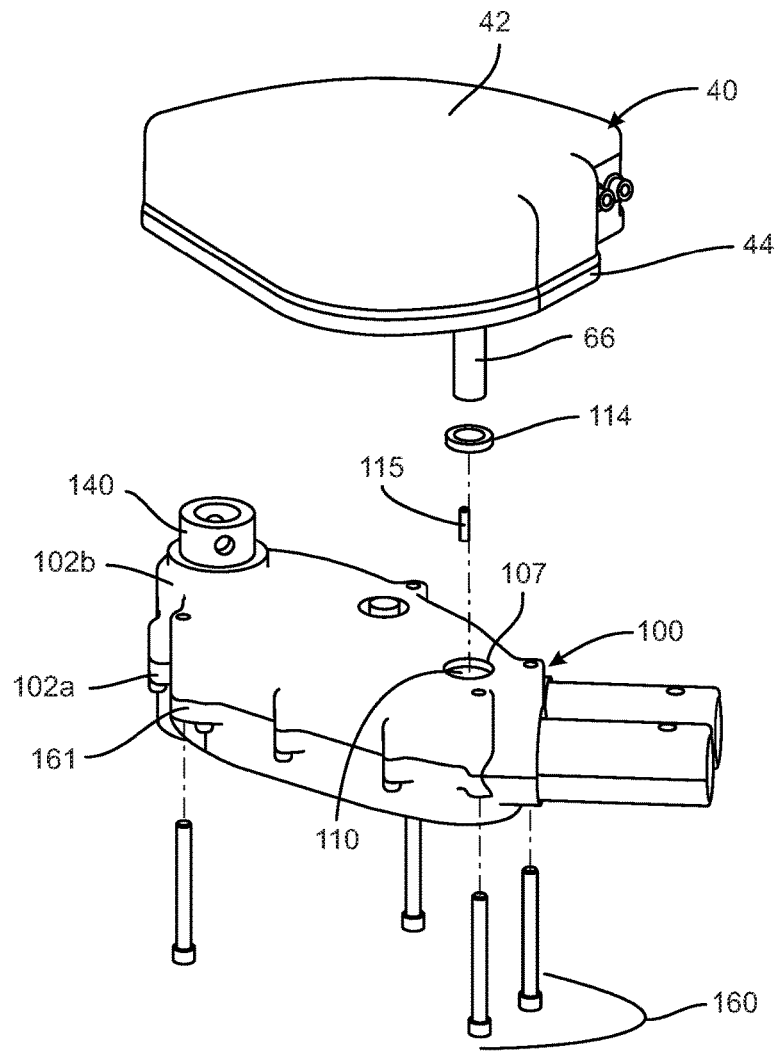
FIG. 21 is an exploded perspective view showing the drive assembly of FIG. 5 mounted on the gear assembly of FIG. 16.

Another cover system is shown in FIGS. 20a-20d that incorporates the motor and gearbox of the drive assembly 40 with the gear assembly 100. In this embodiment, the output shaft 66 of the drive assembly 40 mates with the input pinion shaft 110 of the gear assembly 100 in a conventional manner. Alternatively, the drive assembly output shaft 66 and the gear assembly input pinion shaft 110 can be the same shaft. As depicted in FIG. 21, the base plate 44 of the drive assembly 40 can be fastened to the housing halves 102a, 102b by bolts 160 passing through bosses 161 in the housing halves. The bolts engage threaded bores that extend into the protrusions 45 (FIG. 5) of the base plate to couple the drive and gear assemblies. The output shaft 66 of the drive assembly 40 extends through the seal 114 and opening 107 in the housing half 102b to telescope inside the input pinion shaft 110 of the gear assembly 100. An anti-rotation component or rotating coupling 115 is disposed between the output shaft 66 and input shaft 110 as is known in the art.

It can be appreciated that driving the axle A of the cover through the drive assembly 40 and the gear assembly 100 increases the gear ratio from the 281:1 ratio of the drive assembly. Depending on the selection of gears for the gear assembly, the output of the drive motor 50 of the drive assembly 40 can be reduced up to 733:1 at the output pinion shaft 140 of the gear assembly 100. In this embodiment, the gear assembly 100 operates as a reduction gear box to further reduce the rotational output speed of the drive assembly 40 to a rotational speed and torque suitable to drive the axle A of the cover system. In a further aspect, the gear assembly 100 operates as a torque amplifier, which allows the use of a high speed, low torque motor to drive the cover system, as opposed to the traditional high torque, low speed motors used in prior art systems. Furthermore, high speed motors are well-suited as an open fan motor, as opposed to the closed or encased motors of the prior art. The use of the open fan motor significantly reduces the over-heating issues experienced by prior art cover system motors.

In most tarping or cover systems, particularly cover systems on hauling or agricultural trailers, the drive system must be capable of producing 2000-3000 in-lb of torque and operate at 20-70 rpm in order to deploy the cover across the open top of the container. Thus, the prior art systems utilize high torque electric motors that operate in the 4000-6000 rpm range. The motor is coupled to a reducer gearbox to achieve the requisite rotational speed and torque to drive the cover system. As discussed above, the motors necessary to achieve the desired speed and torque are relatively large motors, typically having a diameter greater than the 3 in. DOT width regulation. The system disclosed herein allows the use of smaller high-speed motors that can readily fit within the 3 in. width limit imposed by the DOT regulation. In one embodiment, the DC drive motor 50 operates at 12000-20000 rpm and produces 2-10 in-lb of torque. The motor has an outer diameter of less than 2.5 inches so that it is easily contained within the 3 in. wide housing. The use of a high-speed DC motor makes it possible for the cover drive assembly to meet the DOT width regulations. Moreover, the high-speed motor also produces a low resistance start-up when the drive system is activated to deploy the cover over the container body.

The present disclosure should be considered as illustrative and not restrictive in character. It is understood that only certain embodiments have been presented and that all changes, modifications and further applications that come within the spirit of the disclosure are desired to be protected.

What is claimed is:

1. A cover system for an open topped container comprising:
    a cover sized to extend across the open top of the container;
    an axle supporting the cover for the cover to be wound onto and unwound therefrom as the cover is retracted and extended over the open top of the container;
    an elongated arm assembly pivotably mountable at one end thereof to the container and having an opposite end adjacent the axle;
    a drive assembly carried by said arm assembly and coupled to the axle to provide rotational force to the axle to wind and unwind the cover on said axle to thereby retract and extend the cover over the open top of the container, the drive assembly including;
        a drive motor including a drive shaft having a hypoid pinion gear;
        a hypoid ring gear rotatably supported in meshed engagement with the hypoid pinion gear;
        a gear train engaged to said hypoid ring gear and including an output shaft coupled to said axle to transmit rotation from the drive motor to said axle; and
        a housing containing the drive motor, the hypoid pinion gear, the hypoid ring gear and the gear train, said housing mounted to said opposite end of said arm assembly,
    wherein said hypoid ring gear and said axle are arranged to rotate about mutually parallel axes; and
    said housing has a maximum height in a direction parallel to said parallel axes of three inches or less.

2. The cover system of claim 1, wherein:
    said cover is configured to be extended from one side of the container to the opposite side of the container;
    said elongated arm assembly is pivotably mountable to an end wall of the container between the sides of the container; and said drive assembly and said housing are configured to extend three inches or less from a side of the container when the cover is either fully retracted or fully extended across the open top of the container.

3. The cover system of claim 1, wherein:
said cover is configured to be extended from one end of the container to the opposite end of the container;
said elongated arm assembly is pivotably mountable to a side of the container between the ends of the container.

4. The cover system of claim 1, wherein:
said a housing defines an interior space; and
said hypoid gear, and said gear train are contained within a gear assembly housing disposed within said interior space, said gear assembly housing configured to seal the interior of the gear assembly housing from the interior space of said drive assembly housing.

5. The cover system of claim 4, wherein:
said drive motor is contained within said interior space; and
said housing defines an enlarged air chamber within said interior space outside said drive motor and said gear assembly housing.

6. The cover system of claim 5, wherein said drive motor is an open fan cooled motor.

7. The cover system of claim 5, further comprising:
a vent opening defined in said housing and in communication with said interior space; and
a seal disposed within said vent opening, the seal being impermeable to water but permeable to gas.

8. The cover system of claim 1, wherein the hypoid ring gear and the hypoid pinion gear have a tooth ratio of at least 30:1.

9. The cover system of claim 8, wherein the hypoid ring gear and the hypoid pinion gear have a tooth ratio of 50:1.

10. The cover system of claim 1, wherein said housing includes a housing cover and a complementary configured base plate, wherein at least the base plate is formed of aluminum.

11. The cover system of claim 1, further comprising a reduction gearbox coupled between said output shaft and said axle supporting the cover.

12. The cover system of claim 1, wherein the drive motor operates at 12,000-20,000 rpm and produces 2-10 in-lb of torque at the drive shaft.

13. A container comprising:
a body including opposite side walls and opposite end walls between said side walls, said body defining an open top;
a cover sized to extend across the open top of the container;
an axle supporting the cover for the cover to be wound onto and unwound therefrom as the cover is retracted and extended over the open top of the container;
an elongated arm assembly pivotably mounted at one end thereof to a wall of the container and having an opposite end adjacent the axle;
a drive assembly carried by said arm assembly and coupled to the axle to provide rotational force to the axle to wind and unwind the cover on said axle to thereby retract and extend the cover over the open top of the container, the drive assembly including;
a drive motor including a drive shaft having a hypoid pinion gear;
a hypoid ring gear rotatably supported in meshed engagement with the hypoid pinion gear;
a gear train engaged to said hypoid ring gear and including an output shaft coupled to said axle to transmit rotation from the drive motor to said axle; and
a housing containing the drive motor, the hypoid pinion gear, the hypoid ring gear and the gear train, said housing mounted to said opposite end of said arm assembly,
wherein said hypoid ring gear and said axle are arranged to rotate about mutually parallel axes; and
said housing has a maximum height in a direction parallel to said parallel axes of three inches or less.

14. The cover system of claim 13, wherein:
said cover is configured to be retracted to one side wall of the container and extended between the side walls of the container;
said elongated arm assembly is pivotably mountable to an end wall of the container; and
said drive assembly and said housing are configured to extend three inches or less from a side wall of the container when the cover is either retracted to said one side wall or extended between the side walls of the container.

15. The container of claim 13, wherein:
said cover is configured to be retracted to one end wall of the container and extended between the end walls of the container;
said elongated arm assembly is pivotably mounted to a side wall of the container between the end walls of the container.

16. The container of claim 13, wherein:
said a housing defines an interior space; and
said hypoid gear, and said gear train are contained within a gear assembly housing disposed within said interior space, said gear assembly housing configured to seal the interior of the gear assembly housing from the interior space of said drive assembly housing.

17. The container of claim 16, wherein said drive motor is an open fan cooled motor.

18. The container of claim 16, further comprising:
a vent opening defined in said housing and in communication with said interior space; and
a seal disposed within said vent opening, the seal being impermeable to water but permeable to gas.

19. The cover system of claim 13, wherein the hypoid ring gear and the hypoid pinion gear have a tooth ratio of at least 30:1.

20. The cover system of claim 1, further comprising a reduction gearbox coupled between said output shaft and said axle supporting the cover.

\* \* \* \* \*